United States Patent Office 3,238,268
Patented Mar. 1, 1966

3,238,268
SORPTION PROCESS
Ellsworth R. Fenske, Palatine, Ill., assignor to Universal Oil Products Company, Des Plaines, Ill., a corporation of Delaware
No Drawing. Filed Mar. 31, 1965, Ser. No. 444,429
6 Claims. (Cl. 260—671)

This application is a continuation-in-part of my copending application Serial No. 120,530, filed June 29, 1961, now abandoned.

This invention relates to a process for the removal of the reaction products of water, boron halide, and a boron halide-modified substantially anhydrous inorganic oxide from a substantially anhydrous aromatic hydrocarbon liquid recycle stream containing the same by contacting said recycle stream containing said reaction products with a substantially anhydrous inorganic oxide. Still more particularly, this invention relates to a process for the removal of the reaction products of water, boron halide, and a boron halide-modified substantially anhydrous inorganic oxide from a substantially anhydrous aromatic hydrocarbon liquid recycle stream containing said reaction products by contacting said recycle stream containing said reaction products with a substantially anhydrous inorganic oxide, sorbing at least a portion of said products in said inorganic oxide, and returning the purified recycle stream to the reaction zone.

The term "sorption" means a mechanism by which at least one component of a mixture selectively combines in some form with the solid or solids with which the mixture is contacted; such mechanisms may be adsorption, absorption, clathration, occlusion or chemical reaction and all of these mechanisms are generically designated herein as "sorption."

I have found that in the production of alkylated aromatic hydrocarbons utilizing a boron trifluoride-modified substantially anhydrous inorganic oxide, alkylatable aromatic hydrocarbon, olefin-acting compound, and boron trifluoride, reaction products of water, boron trifluoride, and boron trifluoride-modified substantially anhydrous inorganic oxide tend to form and accumulate in the various process streams and particularly in the aromatic hydrocarbon liquid recycle process stream. Therefore, one object of the present invention is to provide a sorption process for the efficient and economical removal of these reaction products from the hereinbefore mentioned process streams to prevent their harmful accumulation within the process system. Another object of this invention is to provide a process whereby the reaction products of water, boron halide, and boron halide-modified substantially anhydrous inorganic oxide can be removed continuously from the hereinabove mentioned process streams without appreciable consumption and loss of the recovered purified liquid hydrocarbon. Other objects of this invention will be set forth hereinafter as part of the specifications and in the accompanying examples.

In one embodiment, the present invention relates to the alkylation of an aromatic hydrocarbon in a reaction zone in the presence of boron halide and a boron halide-modified substantially anhydrous inorganic oxide, and comprises the process of withdrawing the resultant effluent from the reaction zone and separating therefrom a substantially anhydrous aromatic hydrocarbon liquid recycle stream containing reaction products of water, boron halide, and boron halide-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said inorganic oxide, so as to reduce the accumulation of said product within the process, and returning the thus purified recycle stream to the reaction zone.

Another embodiment of this invention relates to the alkylation of an aromatic hydrocarbon in a reaction zone in the presence of boron trifluoride and a boron trifluoride-modified substantially anhydrous inorganic oxide, and comprises the process of withdrawing the resultant effluent from the reaction zone and separating therefrom a substantially anhydrous aromatic hydrocarbon liquid recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said organic oxide so as to reduce the accumulation of said product within the process, and returning the thus purified recycle stream to the reaction zone.

A further embodiment of this invention relates to the alkylation of an aromatic hydrocarbon in a reaction zone in the presence of boron trifluoride and a boron trifluoride-modified substantially anhydrous inorganic oxide, and comprises the process of withdrawing the resultant effluent from the reaction zone and separating therefrom a substantially anhydrous benzene hydrocarbon liquid recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said inorganic oxide so as to reduce the accumulation of said product within the process, and returning the thus purified benzene hydrocarbon liquid recycle stream to the reaction zone.

A specific embodiment of this invention relates to the alkylation of an aromatic hydrocarbon in a reaction zone in the presence of boron trifluoride and a boron trifluoride-modified substantially anhydrous inorganic oxide, and comprises the process of withdrawing the resultant effluent from the reaction zone and separating therefrom a substantially anhydrous liquid benzene recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous alumina, sorbing at least a portion of said products in said alumina so as to reduce the accumulation of said product within the process, and returning the thus purified recycle stream to the reaction zone.

Another specific embodiment of this invention relates to the alkylation of an aromatic hydrocarbon in a reaction zone in the presence of boron trifluoride and a boron trifluoride-modified substantially anhydrous inorganic oxide, and comprises the process of withdrawing the resultant effluent from the reaction zone and separating therefrom a substantially anhydrous liquid benzene recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous alumina-sodium meta-aluminate, sorbing at least a portion of said products in said alumina-sodium meta-aluminate so as to reduce the accumulation of said product within the process, and returning the thus purified recycle stream to the reaction zone.

Other embodiments of the present invention will become apparent in considering the specification as hereinafter set forth.

As set forth hereinabove, the present invention relates to a sorption process for the removal of the reaction products of water, boron halide, and a boron halide-modified substantially anhydrous inorganic oxide from a substantially anyhydrous aromatic hydrocarbon liquid recycle process stream utilizing a substantially anhydrous inorprocess stream utilizing a substantially anhydrous inorganic oxide as the sorbing agent. These reaction products of water, boron halide, and boron halide-modified substantially anhydrous inorganic oxide have been encountered as oxides of boron, such as boron trioxide, etc., and as the hydrates of boron oxides such as ortho boric acid, tetra boric acid, meta boric acid, etc. In addition to the hereinabove mentioned reaction products, coordination compounds comprising boron, hydrogen, oxygen, and fluorine sometimes are encountered and are present as reaction products as aforesaid. These compounds probably exist as $B(OH)_2F$, $B(OH)F_2$, etc. Intermediate solid but volatile materials such as $(BOF)_x$ polymers where $x$ may be from about 3 to about 10 or more are also sometimes encountered. These compounds are sometimes encountered in combination with each other, with water, with boron trifluoride as well as singly. It will be appreciated by those skilled in the art that the foregoing list of compounds has by no means exhausted the total number of reaction products that may form when water, boron halide, and a boron halide-modified substantially anhydrous inorganic oxide react with one another. Such enumerations are intended to be exemplary only and not limiting on the broad scope of the present invention.

Many suitable inorganic oxides which are substantially but not necessarily completely anhydrous are utilizable as sorption agents in the process of this invention. They may be utilized in the form of granules, grains, powders, particles, spheres, balls, tabular shapes, etc. These compounds include such substances as alumina, silica, titanium dioxide, zirconium dioxide, chromia, zinc oxide, magnesia, calcium oxide, silica-alumina, silica-magnesia, silica-alumina-magnesia, silica-alumina-zirconia, chromia-alumina, alumina-boria, alumina-sodium meta-aluminate, silica-zirconia, etc. Of the above-mentioned inorganic oxides, substantially but not completely anhydrous alumina is preferred, and particularly, synthetically prepared alumina of a high degree of purity consisting of substantially anhydrous gamma-alumina or substantially anhydrous theta-alumina.

It is preferred to use substantially anhydrous inorganic oxides as hereinabove mentioned as sorption agents inasmuch as the reaction products usually are removed from a substantially anhydrous aromatic hydrocarbon liquid recycle stream. Suitable aromatic hydrocarbons for use in the present invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, normal propylbenzene, isopropylbenzene, etc. Preferred aromatic hydrocarbons are the monocyclic aromatic hydrocarbons, that is, the benzene hydrocarbons. Higher molecular weight alkyl aromatic hydrocarbons are also suitable. These include those aromatic hydrocarbons such as are produced by the alkylation of aromatic hydrocarbons with olefin polymers. Such products are frequently referred to in the art as alkylate, and include hexylbenzene, nonylbenzene, dodecylbenzene, penta-decylbenzene, hexyltoluene, nonyltoluene, dodecyltoluene, penta-decyltoluene, etc. Very often alkylate is obtained as a high boiling fraction in which the alkyl group attached to the aromatic nucleus varies in size from about $C_9$ to $C_{18}$. Other suitable aromatic hydrocarbons, which at specified sorption conditions, depending on melting point of the aromatic chosen, would be in liquid form, would include those aromatic hydrocarbons with two or more aryl groups such as diphenyl, diphenyl-methane, triphenyl, triphenylmethane, fluorene, stilbene, etc. Examples of other aromatic hydrocarbons within the scope of this invention at specified sorption conditions, depending on melting point of the aromatic chosen, would be in liquid form, would include those containing condensed benzene rings. These include naphthalene, anthracene, phenanthrene, naphthacene, rubrene, etc. Of the above-mentioned liquid aromatic hydrocarbons that could be utilized in the process of this invention, the benzene hydrocarbons are preferred, and of the preferred benzene hydrocarbons, benzene itself is particularly preferred.

In accordance with the process of the present invention, the removal of the reaction products of water, boron halide, and born halide-modified substantially anhydrous inorganic oxide from a substantially anhydrous aromatic hydrocarbon liquid recycle stream containing the same is effected by contacting said reaction products with a substantially anhydrous inorganic oxide at a temperature of from about 0° C. or lower to about 300° C. or higher and preferably from about 20° C. to about 250° C., although the exact temperature needed will depend on the particular liquid to be purified. The sorption process is usually carried out at a pressure of from about substantially atmospheric to about 200 atmospheres. The pressure utilized is usually selected to maintain the particularly employed hydrocarbon in substantially liquid phase.

The reaction products may be preferentially sorbed as the inorganic oxide sorbing agent deactivates. For example, when utilizing a substantially anhydrous alumina as the sorbing agent, the fluoride components of the reaction products are often sorbed after the boron components of the reaction products substantially cease being sorbed. However, regeneration of the inorganic oxide sorbing agent by means of inert gas—high temperature regeneration systems, or high pressure steam—high temperature regeneration systems, reactivates the inorganic oxide so that substantially complete sorption of both the boron and fluoride components of the reaction products takes place until the inorganic oxide against deactivates.

In removing the hereinbefore mentioned reaction products from a substantially anhydrous aromatic hydrocarbon liquid recycle stream containing the same with the type of sorption media herein described, either batch or continuous operations may be employed. The actual operation of the process may be upflow or downflow. The details of processes of this general character are familiar to those skilled in the art and any necessary additions or modifications of the above general procedures will be more or less obvious and can be made without departing from the broad scope of this invention.

The process of the present invention is illustrated by the following examples which are introduced for the purpose of illustration only and with no intention of unduly limiting the generally broad scope of the invention.

EXAMPLE I

This example illustrates the formation of the reaction products of water, boron halide, and a boron halide-modified substantially anhydrous inorganic oxide during the production of alkylated aromatics. The processing unit consisted of liquid and gas charge pumps, reactors, high pressure gas separators, pressure controllers, boron trifluoride treating system, feed pretreating system, fractionating columns, and liquid and gas collection systems. The catalyst charged to the reactors comprised a boron trifluoride-modified substantially anhydrous inorganic oxide, namely boron trifluoride-modified alumina. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at a minimum consistent with good conversion. The pressure was selected so that the benzene was kept substantially in the liquid phase. The aromatic to olefin ratio was kept at a maximum at all times consistent with the equipment limitations, in order that few polyethylbenzenes should form. The fractionation section first separated part of the benzene recycle by flash and then the remainder by fractionation. The maximum recycle possible was flashed because of the lower heat requirement for flashing until the ethybenzene and heavier present became a contamination factor. Most of the boron trifluoride present was in the effluent vapors. Part of this boron trifluoride was condensed with the benzene recycle and returned to the reactor. The remaining boron trifluoride passed into the boron trifluoride treating system where it was absorbed and returned to the reactor by compressor after being stripped from the absorbent. The liquid from the hot flash was sent to the benzene fractionating column where after removal of the remaining recycle benzene in the benzene column, the ethylbenzene and heavier was fractionated into an ethylbenzene cut in the overhead of the ethylbenzene column, and a bottom cut. The overhead was sent to storage. The fractionator bottoms were recycled back to a second reactor where the polyethylbenzene was transalkylated to produce ethylbenzene.

During the production of ethylbenzene in the hereinabove outlined process flow scheme, it was observed that reaction products of water, boron trifluoride, and the boron trifluoride-modified alumina tended to form and accumulate in the process streams and particularly in the liquid benzene recycle stream. The overall efficiency of the alkylation process decreased as the concentration of these reaction products became higher. Continued formation and accumulation of these reaction products within the process streams, and particularly in the recycle benzene stream returning to the reactor caused the eventual shutdown of the plant.

EXAMPLE II

This example illustrates the substantial sorption of the reaction products of water, boron trifluoride, and a boron trifluoride-modified substantially anhydrous alumina during the production of alkylated aromatics. The same processing unit described in Example I was also utilized for the experiment described in this example.

The process flow scheme was modified so that a sorption zone containing a substantially anhydrous inorganic oxide, namely 40–50 mesh alumina, was introduced into the recycle benzene stream that had previously contained reaction products. As can be seen in Table I, chemical analyses of the substantially anhydrous liquid benzene before the sorption zone indicated the presence of boron and fluorides. Chemical analyses of the benzene after the sorption zone indicated substantial sorption had occurred.

The overall efficiency of the alkylation process was maintained at the desired level with the sorption zone containing the substantially anhydrous 40–50 mesh alumina in place, as evidenced by the continuous production of ethylbenzene until the plant was shut down at the completion of the run.

Table I

UTILIZATION OF 40–50 MESH ALUMINA AS SORPTION AGENT

| Tests | 1 | 2 | 3 |
|---|---|---|---|
| Accumulated hours | 1–24 | 25–48 | 49–72 |
| Inorganic oxide sorbing agent | 40–50 mesh alumina | | |
| Liquid containing reaction products | Recycle benzene stream | | |
| Sorber pressure, p.s.i.g | 15 | 15 | 15 |
| Sorber temperature, °C | 20 | 20 | 20 |
| Benzene LHSV | 6.0 | 6.0 | 6.0 |
| Boron present before sorber, p.p.m. (wt.) | 34 | 27 | 39 |
| Boron present after sorber, p.p.m. (wt.) | 3 | 2 | Trace |
| Percent boron sorption | 91.2 | 92.6 | 99+ |
| Fluoride present before sorber, p.p.m. (wt.) | 131 | 89 | 140 |
| Fluoride present after sorber, p.p.m. (wt.) | 10 | 4 | 2 |
| Percent fluoride sorption | 92.3 | 95.5 | 98.6 |

EXAMPLE III

This example illustrates the substantial sorption of the reaction products of water, boron trifluoride, and a boron trifluoride-modified substantially anhydrous alumina during the production of alkylated aromatics. The same processing unit described in Example I was also utilized for the experiment described in this example.

The process flow scheme was modified so that a sorption zone containing a substantially anhydrous inorganic oxide, namely 4–8 mesh alumina, was introduced into the recycle benzene stream that had previously contained reaction products. As can be seen in Table II, chemical analyses of the substantially anhydrous benzene before the sorption zone indicated the presence of boron and fluorides. Chemical analyses of the benzene after the sorption zone indicated substantial sorption had occurred.

The overall efficiency of the alkylation process was maintained at the desired level with the sorption zone containing the substantially anhydrous 4–8 mesh alumina in place, as evidenced by the continuous production of ethylbenzene until the plant was shut down at the completion of the run.

Table II

UTILIZATION OF 4–8 MESH ALUMINA AS SORPTION AGENT

| Tests | 1 | 2 | 3 | 4 |
|---|---|---|---|---|
| Accumulated hours | 1–24 | 25–48 | 49–72 | 73–96 |
| Inorganic oxide sorbing agent | 4–8 mesh alumina | | | |
| Liquid containing reaction products | Recycle benzene stream | | | |
| Sorber pressure, p.s.i.g | 13 | 13 | 13 | 13 |
| Sorber temperature, °C | 240 | 240 | 240 | 240 |
| Benzene LHSV | 10 | 10 | 10 | 10 |
| Boron present before sorber, p.p.m. (wt.) | 52 | 46 | 48 | 59 |
| Boron present after sorber, p.p.m. (wt.) | <1 | 1 | 2 | 2 |
| Percent boron sorption | 99+ | 97.8 | 95.8 | 96.6 |
| Fluoride present before sorber, p.p.m. (wt.) | 207 | 277 | 202 | 257 |
| Fluoride present after sorber, p.p.m. (wt.) | 2 | 4 | 3 | 4 |
| Percent fluoride sorption | 99.0 | 98.5 | 98.5 | 98.4 |

EXAMPLE IV

This example illustrates the substantial sorption of the reaction products of water, boron trifluoride, and a boron trifluoride-modified substantially anhydrous alumina during the production of alkylated aromatics. The same processing unit described in Example I was also utilized for the experiment described in this example.

The process flow scheme was modified so that a sorption zone containing a substantially anhydrous inorganic oxide, namely 10–20 mesh alumina-sodium meta-aluminate, was introduced into the recycle benzene stream that had previously contained reaction products. As can be seen in Table III, chemical analyses of the substantially anhydrous benzene before the sorption zone indicated the presence of boron and fluorides. Chemical analyses of the benzene after the sorption zone indicated substantial sorption had occurred.

The overall efficiency of the alkylation process was maintained at the desired level with the sorption zone containing the substantially anhydrous 10–20 mesh alumina-sodium meta-aluminate in place as evidenced by the continuous production of ethylbenzene until the plant was shut down at the completion of the run.

Table III

UTILIZATION OF ALUMINA-SODIUM META-ALUMINATE AS SORPTION AGENT

| Tests | 1 | 2 | 3 | 4 |
|---|---|---|---|---|
| Accumulated hours | 1–24 | 25–48 | 49–72 | 73–96 |
| Inorganic oxide sorbing agent | 10–20 mesh alumina-sodium meta-aluminate | | | |
| Liquid containing reaction products | Recycle benzene stream | | | |
| Sorber pressure, p.s.i.g | 15 | 15 | 15 | 15 |
| Sorber temperature, °C | 20 | 20 | 20 | 20 |
| Benzene LHSV | 6.0 | 6.0 | 6.0 | 6.0 |
| Boron present before sorber, p.p.m. (wt.) | 37 | 35 | 20 | 13 |
| Boron present after sorber, p.p.m. (wt.) | 4 | 2 | 2 | 2 |
| Percent boron sorption | 89.2 | 94.3 | 90.0 | 91.3 |
| Fluoride present before sorber, p.p.m. (wt.) | 128 | 178 | 124 | 68 |
| Fluoride present after sorber, p.p.m. (wt.) | 9 | 4 | 4 | 6 |
| Percent fluoride sorption | 92.8 | 97.4 | 96.8 | 91.2 |

EXAMPLE V

This example illustrates the substantial sorption of the reaction products of water, boron trifluoride, and a boron trifluoride-modified substantially anhydrous alumina during the production of alkylated aromatics. The same processing unit described in Example I was also utilized for the experiment described in this example.

The process flow scheme was modified so that a sorption zone containing a substantially anhydrous inorganic oxide, namely lump calcium oxide, was introduced into the recycle benzene stream that had previously contained reaction products. As can be seen in Table IV, chemical analyses of the substantially anhydrous benzene before the sorption zone indicated the presence of boron and fluorides. Chemical analyses of the benzene after the sorption zone indicated sorption had occurred.

The overall efficiency of the alkylation process was maintained at the desired level for a shorter time with the sorption zone containing the substantially anhydrous lump calcium oxide in place.

Table IV

UTILIZATION OF LUMP CALCIUM OXIDE AS SORPTION AGENT

| Test | 1 |
|---|---|
| Accumulated hours | 1–24. |
| Inorganic oxide sorbing agent | Lump calcium oxide. |
| Liquid containing reaction products | Recycle benzene stream. |
| Sorber pressure, p.s.i.g | 15. |
| Sorber temperature, °C | 20. |
| Benzene LHSV | 6.0. |
| Boron present before sorber, p.p.m. (wt.) | 39. |
| Boron present after sorber, p.p.m. (wt.) | 27. |
| Percent boron sorption | 30.8. |
| Fluoride present before sorber, p.p.m. (wt.) | 140. |
| Fluoride present after sorber, p.p.m. (wt.) | 104. |
| Percent fluoride sorption | 25.0. |

EXAMPLE VI

This example illustrates the substantial sorption of the reaction products of water, boron trifluoride, and a boron trifluoride-modified substantially anhydrous alumina during the production of alkylated aromatics. The same processing unit described in Example I was also utilized for the experiment described in this example.

The process flow scheme was modified so that a sorption zone containing a substantially anhydrous inorganic oxide, namely ¼" diameter zirconium dioxide spheres, was introduced into the recycle benzene stream that had previously contained reaction products. As can be seen in Table V, chemical analyses of the substantially anhydrous benzene before the sorption zone indicated the presence of boron and fluorides. Chemical analyses of the benzene after the sorption zone indicated substantial sorption had occurred.

The overall efficiency of the alkylation process was maintained at the desired level with the sorption zone containing the substantially anhydrous ¼" diameter zirconium dioxide spheres in place as evidenced by the continuous production of ethylbenzene until the plant was shut down at the completion of the run.

Table V

UTILIZATION OF ZIRCONIUM DIOXIDE AS SORBING AGENT

| Tests | 1 | 2 |
|---|---|---|
| Accumulated hours | 1–24 | 25–48 |
| Inorganic oxide sorbing agent | ¼" diameter zirconium dioxide spheres | |
| Liquid containing reaction products | Recycle benzene stream | |
| Boron present before sorber, p.p.m. (wt.) | 36 | 20 |
| Boron present after sorber, p.p.m. (wt.) | 6 | 4 |
| Percent boron sorption | 83.3 | 80.0 |
| Fluoride present before sorber, p.p.m. (wt.) | 141 | 92 |
| Fluoride present after sorber, p.p.m. (wt.) | 21 | 17 |
| Percent fluoride sorption | 85.1 | 81.5 |

EXAMPLE VII

This example illustrates the substantial sorption of the reaction products of water, boron trifluoride, and a boron trifluoride-modified substantially anhydrous alumina during the production of alkylated aromatics. The same processing unit described in Example I was utilized in this experiment with the exception that substantially anhydrous ethylbenzene and ethylene were charged to the unit so that diethylbenzene was produced.

The process flow scheme was modified so that a sorption zone containing a substantially anhydrous inorganic oxide, namely 20–30 mesh alumina, was introduced into the recycle ethylbenzene stream that had reaction products contained in it. As can be seen in Table VI, chemical analyses of the substantially anhydrous ethylbenzene before the sorption zone indicated the presence of boron and fluorides. Chemical analyses of the ethylbenzene after the sorption zone indicated that substantial sorption had occurred.

The overall efficiency of the alkylation process was maintained at the desired level with the sorption zone containing the substantially anhydrous 20–30 mesh alumina in place, as evidenced by the continuous production of diethylbenzene until the plant was shut down at the completion of the run.

Table VI

UTILIZATION OF 20–30 MESH ALUMINA AS SORPTION AGENT

| Tests | 1 | 2 | 3 |
|---|---|---|---|
| Accumulated hours | 1–24 | 25–48 | 49–72 |
| Inorganic oxide sorbing agent | 20–30 mesh alumina | | |
| Liquid containing reaction products | Recycle ethylbenzene stream | | |
| Sorber pressure, p.s.i.g | 50 | 50 | 50 |
| Sorber temperature, °C | 38 | 38 | 38 |
| Ethylbenzene LHSV | 10.0 | 10.0 | 10.0 |
| Boron present before sorber, p.p.m. (wt.) | 18 | 16 | 41 |
| Boron present after sorber, p.p.m. (wt.) | 1 | 2 | <1 |
| Percent boron sorption | 94.4 | 87.5 | >97.6 |
| Fluoride present before sorber, p.p.m. (wt.) | 80 | 138 | 175 |
| Fluoride present after sorber, p.p.m. (wt.) | 3 | 2 | 4 |
| Percent fluoride sorption | 96.2 | 98.5 | 97.7 |

EXAMPLE VIII

This example illustrates the substantial sorption of the reaction products of water, boron trifluoride, and a boron trifluoride-modified substantially anhydrous alumina during the production of alkylated aromatics. The same processing unit described in Example I was also utilized for the experiment described in this example with the exception that substantially anhydrous isopropylbenzene and propylene were charged to the unit so that diisopropylbenzene was produced.

The process flow scheme was modified so that a sorption zone containing a substantially anhydrous inorganic oxide, namely 20–40 mesh alumina, was introduced into the recycle isopropylbenzene stream that had reaction products contained in it. As can be seen in Table VII, chemical analyses of the substantially anhydrous isopropylbenzene before the sorption zone indicated the presence of boron and fluorides. Chemical analyses of the isopropylbenzene after the sorption zone indicated substantial sorption had occurred.

The overall efficiency of the alkylation process was maintained at the desired level with the sorption zone containing the substantially anhydrous 20–40 mesh alumina in place, as evidenced by the continuous production of diisopropylbenzene until the plant was shut down at the completion of the run.

*Table VII*

UTILIZATION OF 20-40 MESH ALUMINA AS SORPTION AGENT

| Tests | 1 | 2 | 3 | 4 |
|---|---|---|---|---|
| Accumulated hours | 1–24 | 25–48 | 49–72 | 73–96 |
| Inorganic oxide sorbing agent | 20–40 mesh alumina | | | |
| Liquid containing reaction products | Recycle isopropylbenzene stream | | | |
| Sorber pressure, p.s.i.g. | 15 | 15 | 15 | 15 |
| Sorber temperature, °C | 20 | 20 | 20 | 20 |
| Isopropylbenzene LHSV | 6.0 | 6.0 | 6.0 | 6.0 |
| Boron present before sorber, p.p.m. (wt.) | 9 | 11 | 10 | 11 |
| Boron present after sorber, p.p.m. (wt.) | <1 | 0 | <1 | <1 |
| Percent boron sorption | >88.9 | 100 | >90.0 | >90.9 |
| Fluoride present before sorber, p.p.m. (wt.) | 44 | 50 | 44 | 33 |
| Fluoride present after sorber, p.p.m. (wt.) | 2 | 0 | 2 | 3 |
| Percent fluoride sorption | 95.4 | 100 | 95.4 | 90.9 |

I claim as my invention:

1. In the alkylation of an aromatic hydrocarbon in a reaction zone in the presence of boron halide and a boron halide-modified substantially anhydrous inorganic oxide, the process which comprises withdrawing the resultant effluent from the reaction zone and separating therefrom a substantially anhydrous aromatic hydrocarbon liquid recycle stream containing reaction products of water, boron halide, and boron halide-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said inorganic oxide so as to reduce the accumulation of said products within the process, and returning the thus purified recycle stream to the reaction zone.

2. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a substantially anhydrous aromatic hydrocarbon liquid recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said inorganic oxide so as to reduce the accumulation of said products within the process, and returning the thus purified recycle stream to the reaction zone.

3. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a substantially anhydrous benzene hydrocarbon liquid recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said inorganic oxide so as to reduce the accumulation of said products within the process, and returning the thus purified benzene hydrocarbon liquid recycle stream to the reaction zone.

4. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a substantially anhydrous liquid benzene recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous inorganic oxide, sorbing at least a portion of said products in said inorganic oxide so as to reduce the accumulation of said products within the process, and returning the thus purified recycle stream to the reaction zone.

5. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a substantially anhydrous liquid benzene recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous alumina, sorbing at least a portion of said products in said alumina so as to reduce the accumulation of said products within the process, and returning the thus purified recycle stream to the reaction zone.

6. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a substantially anhydrous liquid benzene recycle stream containing reaction products of water, boron trifluoride, and boron trifluoride-modified substantially anhydrous inorganic oxide, said products including hydrates of boron oxides and coordination compounds comprising boron, hydrogen, oxygen and fluorine, contacting the separated recycle stream containing said reaction products with a substantially anhydrous alumina-sodium meta-aluminate, sorbing at least a portion of said products in said alumina-sodium meta-aluminate so as to reduce the accumulation of said products within the process, and returning the thus purified recycle stream to the reaction zone.

References Cited by the Examiner
UNITED STATES PATENTS

| | | | |
|---|---|---|---|
| 2,347,945 | 5/1944 | Frey | 260—683.15 |
| 2,374,819 | 5/1945 | Kanhofer et al. | 260—683.41 |
| 2,939,890 | 6/1960 | Hervert et al. | 260—671 |
| 2,995,611 | 8/1961 | Linn et al. | 260—671 |

DELBERT E. GANTZ, *Primary Examiner.*